Jan. 31, 1967      C. C. WARREN      3,301,191
MECHANICAL SEAL ASSEMBLY
Filed April 12, 1965
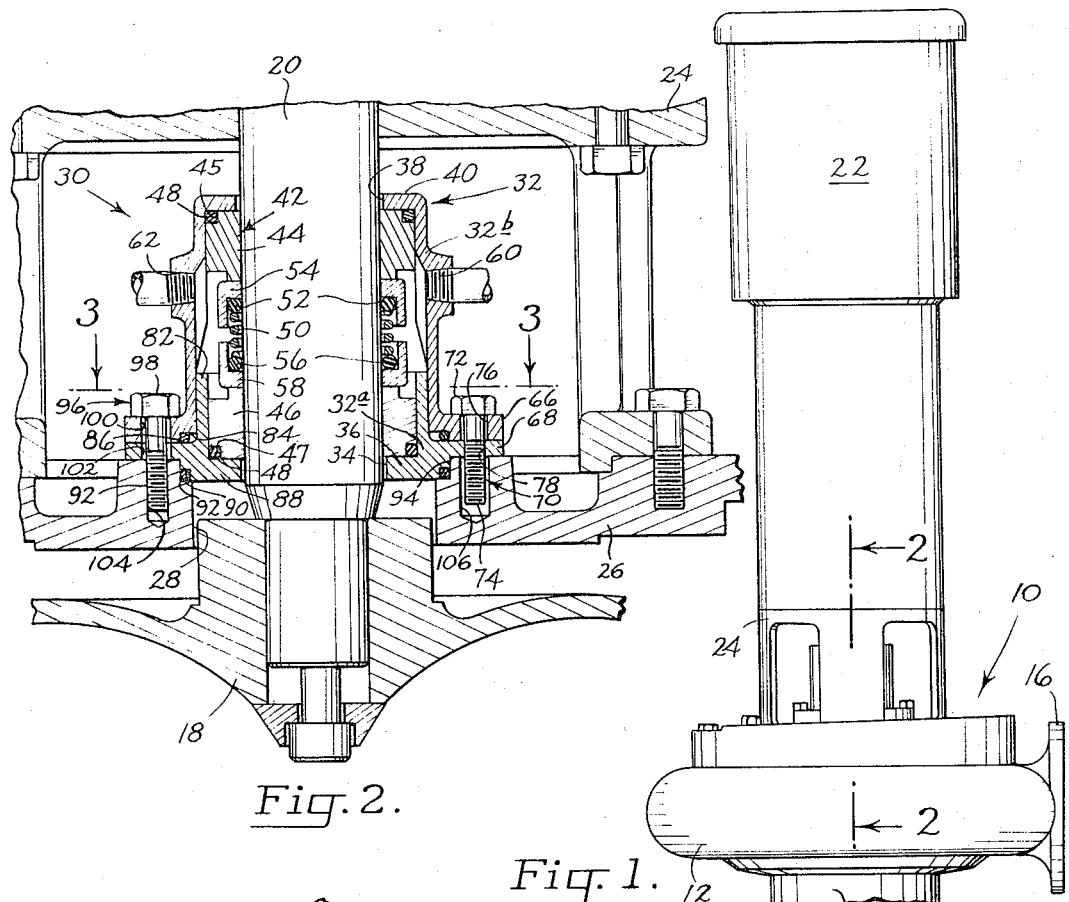
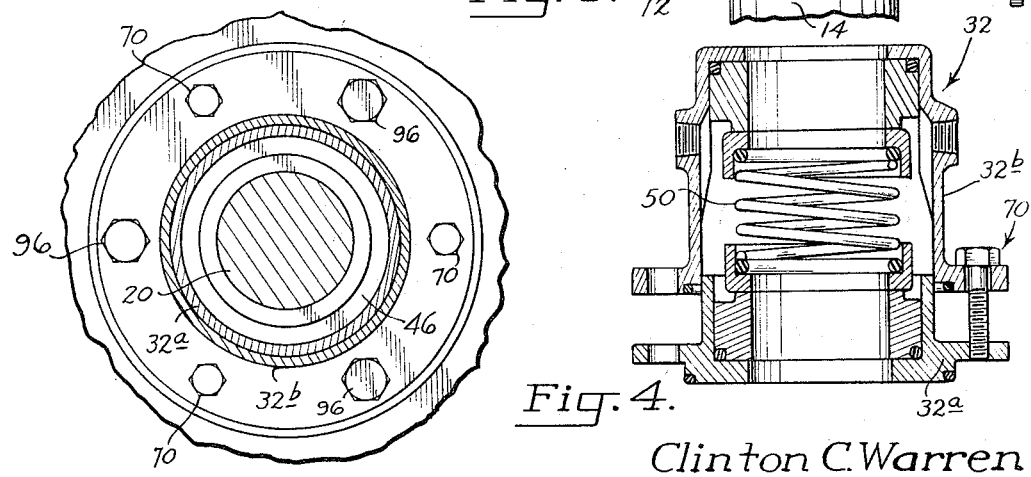
Clinton C. Warren
INVENTOR
BY Kolisch & Hartwell
Attys.

United States Patent Office 3,301,191
Patented Jan. 31, 1967

3,301,191
MECHANICAL SEAL ASSEMBLY
Clinton C. Warren, Milwaukie, Oreg., assignor to Cornell Manufacturing Co., Milwaukie, Oreg., a corporation of Oregon
Filed Apr. 12, 1965, Ser. No. 447,258
3 Claims. (Cl. 103—111)

This invention relates in general to mechanical seal assemblies, and more particularly concerns mechanical seal assemblies for use in conjunction with pumps featuring a construction whereby, if need be, the entire assembly is readily removed from the pump and replaced.

The invention is described heerinbelow in connection with the pumping of sewage, but in so describing the invention it is not intended to be specifically limited only to applications where such a material is being handled.

A type of pump presently used in the treatment of sewage includes a pump housing and within this pump housing an impeller, and this impeller is connected to an impeller shaft which extends outside the housing, usually from the top of the housing, where the impeller shaft is connected to a motor which drives the pump. Means is provided for sealing the impeller shaft to the pump housing to prevent leakage of sewage from the housing around the shaft. Various types of sealing arrangements have been proposed for performing this sealing function, and an organization which has found relatively wide use comprises a mechanical seal assembly instead of the usual stuffing box. Certain difficulties have been introduced, however, with the use of mechanical seal assemblies, and a general object of this invention is to provide improvements in such assemblies tending to eliminate or at least minimize these difficulties.

A mechanical seal assembly may include a casing, and within this casing sealing rings, annular seals seated on the rings, and biasing means such as a coil spring for producing sealing engagement of the annular seals with the casing and shaft thus to seal the parts together. One object of this invention is to provide an assembly which may be shipped as a complete unit for installation, with the various parts mentioned properly oriented within the casing, whereby on installation essentially all that is required is to fasten the unit in place and perform a simple tightening operation.

In a mechanical seal assembly of the type above described, the annular seals that produce sealing engagement may be made of an elastomer such as neoprene and the like. With a spring pressing on such material, and if such is done over a long period of time before installation of the assembly, a permanent set or other destruction may take place in the seal impairing its operability when the assembly is finally installed. Therefore, another object of this invention is to provide a novel construction for a mechanical seal assembly, capable of being distributed as a complete unit, wherein provision is made for relaxing the bias of a spring therein to eliminate damage to seals, without dismantling the assembly.

A more specific object is to provide a mechanical seal assembly, with provision made for relaxing the bias of a spring therein, which further includes structure whereby parts in the assembly are maintained in proper aligned position when such relaxing of spring bias takes place.

Yet another object is to provide a mechanical seal assembly for installation with a pump, featuring novel structure whereby the assembly is properly centered on the pump when installed.

Another object is to provide a mechanical seal assembly, so constructed that when installed, corrosion damage to the assembly and surrounding parts of the pump is minimized.

These and other objects and advantages are attained by the invention, and the same is described hereinbelow in conjunction with the accompanying drawings, wherein:

FIG. 1 is a side elevation illustrating portions of a pump of the type that might incorporate the mechanical seal assembly contemplated;

FIG. 2 is a cross-sectional view, taken generally along the line 2—2 of FIG. 1, and on a somewhat larger scale;

FIG. 3 is a cross-sectional view taken generally along the line 3—3 in FIG. 2; and FIG. 4 is a view corresponding to portions of FIG. 2, but showing a spring within the assembly relaxed, and the position the parts attain with this relaxation in the spring.

Referring now to the drawings, and first of all more particularly to FIG. 1, here a pump such as might be used for handling sewage is indicated generally at 10. The pump includes a pump housing 12 having an inlet adjacent the base of the housing connected to a pipe 14 through which sewage is fed into the pump. The outlet for the pump is shown at 16.

Referring now also to FIG. 2, fluid is moved through the pump housing by rotating an impeller partially shown at 18 mounted within the pump housing. An impeller shaft 20 connects impeller 18 with a motor such as the electric motor 22 supported over the pump housing on frame structure 24. Pump housing 12 includes a back side plate 26 and to reach the impeller, the impeller shaft 20 extends through an aperture or bore 28 provided in plate 26.

Leakage from inside the pump housing through aperture 28 is prevented by a mechanical seal assembly indicated generally at 30, sealed to the pump housing and to the impeller shaft as will be hereinafter described.

Considering the construction of this seal assembly, the assembly comprises a casing 32 made up of lower and upper casing section 32a and 32b, respectively. These casing sections are axially aligned on the impeller shaft and face each other. The casing sections are hollow. An aperture 34 in end wall 36 of section 32a permits the passage of the impeller shaft through this casing section, and an aperture 38 in end wall 40 of casing section 32b accommodates the passage of the impeller shaft through this section 32b.

Lodged within the casing is mechanical seal structure indicated generally at 42. The structure comprises a pair of seal rings which may be of carbon steel and shown at 44, 46, each of which has an annular recess (shown at 45 and 47) extending around the outer circumference thereof which seats an O-ring or seal 48. These O-rings provide a fluid tight seal between the casing and seal rings 44, 46.

Between seal rings 44, 46, and encircling the impeller shaft, is a compression spring 50. The upper end of this spring in FIG. 2 bears on an O-ring or other seal 52 which is lodged within a cup-shaped seal part 54, which may be of ceramic. The lower end of the spring bears on an O-ring 56 lodged within a similar seal part 58. The compression spring biases the seal parts and seal rings axially apart (and at the same time tends to urge the casing sections 32a, 32b axially apart). In producing the bias, O-rings 52, 56 are pressed into engagement with the impeller shaft to seal the shaft and seal parts 54, 58.

In casing section 32b ports 60, 62 enable the admission of liquid or lubricant to the inside of the casing, which keeps the various parts wetted so that they best perform their sealing function.

As above indicated, a feature of the invention is that the seal assembly may be stored and distributed as a unit, with any spring corresponding to spring 50 relaxed and thus exerting no damaging bias on members such as the O-rings described. In FIG. 4 the parts of the seal assembly are shown in the relative position that they have when spring 50 is in such a relaxed state.

To permit such relaxation of spring 50, and at the same time containment of the parts, the casing sections are interconnected in a novel manner which enables them to be spaced apart while still connected one to the other. A different fastening means from the one interconnecting the casing sections together attaches the casing to the pump housing with the assembly in operative position.

More specifically, casing section 32b includes a flange 66 extending circumferentially about the casing section and projecting radially outwardly from shaft 20. A complementing flange 68 is provided in casing section 32a. The flanges have sides which face each other and that are closely adjacent, in fact, that bear on each other with the assembly in operative position about the impeller shaft.

Attaching the two casing sections are screw fasteners or screws 70 having heads 72 and threaded ends 74. These screws project through and fit loosely within a series of bores 76 distributed circumferentially about flange 66. Flange 68 below flange 66 has a series of bores 78 therein, which are internally threaded and the threaded ends 74 of the screws are in threaded engagement with the internal threads. With the casing sections together as they are when the assembly is in operative position, threaded ends 74 project some distance beyond flange 68. These projecting ends, however, enable the screws to be backed off, accommodating spacing of the two casing sections under the urging of compression spring 50, whereby the casing sections have the relative position shown in FIG. 4. With this spacing there is substantially no compression of spring 50.

Means is provided for sealing the two casing sections together and for maintaining them in proper axial alignment, and this alignment is maintained regardless of the relative positions of the casing sections. Thus, integral with casing section 32a and projecting axially upwardly therefrom in the figures, is a sleeve 82. This sleeve is snugly and telescopically received within the interior of the upper casing section. The outer surface of this sleeve functions as a guide surface maintaining axial alignment of the two casing sections. The inner surface of the sleeve defines a well receiving seal part 46. In this way seal part 46 remains properly centered regardless of the relative positions of the casing sections.

An annular recess 84 extends around casing section 32b which communicates with the side of the flange 66 facing flange 68, and also with the interior of casing section 32b. This recess 84 forms a shelf receiving an O-ring 86, which, with the casing sections together, seals the two casing sections. With separation of the casing sections, the proper concentric position of the ring is maintained by reason of the ring occupying a seated position in the recess against the cylindrical wall 84a which bounds the outer margin of recess 84 (see FIG. 4).

Shown projecting axially downwardly from casing section 32a in FIG. 2 is a short cylindrical extension 88. An annular recess 90 extends about the end of this cylindrical extension, which opens to the side and also toward the base of the extension. This recess provides a seat for an O-ring 92. Back side plate 26 of the pump housing has a counterbore 94 extending downwardly from the top thereof, which counterbore receives the cylindrical extension and O-ring described. With the casing clamped firmly against the back side plate, the O-ring seals the bottom casing section to the plate. The counterbore and the cylindrical extension coact to produce proper alignment of the casing and the pump housing.

It is important to note that the seal prevents any pumpage liquid from flowing over those surfaces in the cylindrical extension and counterbore that produce alignment. This feature inhibits corrosion of such surfaces, and is important in contributing to ease of replacement of the mechanical seal assembly.

The casing and its parts are mounted on the back side plate by screws or fasteners 96 with heads 98 resting on flange 66. These screws extend through and are loosely received within a series of bores 100 and 102 in flanges 66, 68. A series of internally threaded bores 104 are distributed about the impeller shaft in back side plate 26 and the threaded ends of screws 96 are in threaded engagement with these internally threaded bores.

As earlier described, screws 70 fastening the casing section together have considerable greater length than the combined width of the flanges, to permit spacing of the casing sections. Distributed about the impeller shaft and in the back side plate are a series of bores 106 of relatively large diameter that receive the protruding ends of screws 70, with the casing sections close together and mounted on plate 26.

Preferably bores 104 and 106 do not extend entirely through the back side plate. This prevents pumpage from contacting the bottom ends of the screws, and is important in inhibiting corrosion damage and facilitating replacement of the seal assembly should such be necessary.

It is felt that the operation of the assembly herein disclosed should be clear. Briefly, when in storage and prior to use, the parts of the assembly are positioned as in FIG. 4, with spring 50 relaxed. To place in operative position about a shaft, the entire unit is slipped about the shaft and with tightening of screws 70 and securing of the casing to the back side plate, the assembly is placed in operative position.

While an embodiment of the invention has been described, it is appreciated that changes and variations are possible without departing therefrom. It is desired to cover all such modifications of the invention as would be apparent to one skilled in the art, and that come within the scope of the appended claims.

It is claimed and desired to be secured by Letters Patent:

1. A mechanical seal assembly for mounting about a shaft comprising a pair of hollow casing sections adapted to be mounted in an axially aligned position on the shaft with the casing sections facing each other; each of said casing sections including a flange on the outside thereof that extends circumferentially about and projects radially outwardly from the shaft upon which the assembly is mounted; said flanges of the two casing sections having complementing sides that are directly adjacent and face each other with the seal assembly in operative position on a shaft; an annular recess in one of the casing sections concentric with its flange; said recess along one side opening to the interior of said one section and along an adjacent side opening to the complementing side of the flange for said one casing section; said recess being bounded along a side of the recess opposite the recess's said one side by a cylindrical wall; said recess forming a shelf for receiving an annular seal functioning to seal the two sections together with the device in operative position; an axially extending sleeve integral with the other of the casing sections extending from adjacent the flange of the other section across said shelf, to be snugly and telescopically received in the interior of said one casing section; mechanical seal structure within said casing including spring means biasing the casing sections axially apart; and fastener means connecting the two flanges of the casing sections adjustable to permit, with the casing sections still connected, an axial spacing to be introduced between the flanges with a corresponding spacing between the casing sections and accompanying relaxation of the biasing of said spring means; said cylindrical wall when a spacing exists between the flanges of the casing sections providing a seat for an annular seal received within the shelf formed by the recess.

2. A pump including a pump housing and an impeller shaft extending through an aperture in the pump housing; a pair of hollow casing sections mounted on the shaft with the casing sections axially aligned and facing each other; each of said casing sections including a flange on the outside thereof that extends circumferentially about and projects radially outwardly from the shaft, and said flanges of the two casings sections having complementing sides that are directly adjacent and face each other; mechanical seal structure within the casing including spring means biasing the casing sections axially apart; a wall in the pump housing supporting one of the flanges of said casing; a first series of bores in said wall; elongated screw-fastener means in threaded engagement with said one flange connecting the two flanges of the casing sections together, and having ends loosely received within said first series of bores; said fastener means having a retracted position, where the ends of the fastener means are retracted from said first series of bores and in threaded engagement with said one flange, and said fastener means then operating to hold the casing sections with an axial spacing introduced therebetween and with accompanying relaxation of the spring means biasing said casing sections apart; a second series of bores in said wall; and screw-fastener means passing loosely through the flanges extending into said second series of bores and in threaded engagement with said wall.

3. The pump of claim 2, wherein said wall which supports said one flange of the casing has a cylindrical counterbore projecting inwardly from that side of the wall which faces the casing, and said casing section which rests on said wall has a cylindrical extension fitting within the counterbore functioning to position the casing relative to the wall, and wherein an annular seal is provided between the end of said extension and the bottom of such counterbore, said cylindrical extension having an annular recess extending about the end thereof opening both to the side of the extension and to the end of the extension and said annular seal being seated within said annular recess.

References Cited by the Examiner
UNITED STATES PATENTS

| | | | |
|---|---|---|---|
| 1,931,733 | 10/1933 | Leibing | 277—41 |
| 2,707,920 | 5/1955 | Creasy | 103—114 |
| 2,853,020 | 9/1958 | Hollinger et al. | 277—62 |
| 3,084,943 | 4/1963 | Weis | 277—35 |
| 3,250,222 | 5/1966 | Zeidler | 103—115 |

DONLEY J. STOCKING, *Primary Examiner.*

HENRY F. RADUAZO, *Examiner.*